(12) United States Patent
Ueda et al.

(10) Patent No.: US 11,962,199 B2
(45) Date of Patent: Apr. 16, 2024

(54) ROTOR AND SPEED REDUCER INCLUDING THE ROTOR

(71) Applicant: NIDEC CORPORATION, Kyoto (JP)

(72) Inventors: Tomoya Ueda, Kyoto (JP); Toshiyuki Sasaki, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 91 days.

(21) Appl. No.: 17/666,522

(22) Filed: Feb. 7, 2022

(65) Prior Publication Data

US 2022/0255381 A1    Aug. 11, 2022

(30) Foreign Application Priority Data

Feb. 8, 2021   (JP) ................................. 2021-018627

(51) Int. Cl.
| | |
|---|---|
| *H02K 1/30* | (2006.01) |
| *H02K 1/27* | (2022.01) |
| *H02K 1/278* | (2022.01) |
| *H02K 1/28* | (2006.01) |
| *H02K 7/116* | (2006.01) |
| *H02K 21/16* | (2006.01) |

(52) U.S. Cl.
CPC ............... *H02K 1/30* (2013.01); *H02K 1/278* (2013.01); *H02K 1/28* (2013.01); *H02K 7/116* (2013.01); *H02K 21/16* (2013.01)

(58) Field of Classification Search
CPC ........... H02K 1/30; H02K 1/278; H02K 1/28; H02K 7/116; H02K 21/16
See application file for complete search history.

(56) References Cited

U.S. PATENT DOCUMENTS

| | | | | |
|---|---|---|---|---|
| 2003/0193258 | A1* | 10/2003 | Reiter, Jr. .............. | H02K 1/265 |
| | | | | 310/216.004 |
| 2018/0198333 | A1* | 7/2018 | Ohori ..................... | H02K 1/278 |
| 2019/0393747 | A1* | 12/2019 | Tang ........................ | H02K 5/20 |
| 2021/0135519 | A1* | 5/2021 | Masera .................. | H02K 7/083 |

FOREIGN PATENT DOCUMENTS

JP        2003037954        2/2003

* cited by examiner

*Primary Examiner* — Thomas Truong
(74) *Attorney, Agent, or Firm* — JCIPRNET

(57) ABSTRACT

A rotor includes a shaft, a cylindrical rotor core, a connector, magnets and a cover. The shaft extends along a central axis. The rotor core surrounds the shaft. The connector is provided radially inside the rotor core and connects the rotor core and the shaft. The magnets are provided radially outside the rotor core along a circumferential direction. The cover is provided radially outside the magnets. The connector includes a cylindrical body surrounding the shaft and a flange. The flange extends radially outward from one axial end of the body and faces the magnets in the axial direction. The cover includes a peripheral surface and an eave. The peripheral surface faces the magnets in a radial direction. The eave extends radially inward from an other axial end of the peripheral surface and faces the magnets in the axial direction.

9 Claims, 6 Drawing Sheets

ROTOR AND SPEED REDUCER INCLUDING THE ROTOR

CROSS-REFERENCE TO RELATED APPLICATIONS

The present invention claims priority under 35 U.S.C. § 119 to Japanese Application No. 2021-018627 filed on Feb. 8, 2021 the entire content of which is incorporated herein by reference.

FIELD OF THE INVENTION

The disclosure relates to a rotor and a speed reducer including the rotor.

BACKGROUND

A conventional rotor includes a shaft, a rotor core, a connector, a magnet, and a cover. The rotor core surrounds the shaft and is provided in a substantially cylindrical shape. The magnet is fitted onto the rotor core from outside in the conventional rotor.

However, in the conventional rotor, the magnet may be displaced in the axial direction during rotation.

The disclosure provides a rotor capable of preventing a magnet from being displaced in the axial direction during rotation and a speed reducer including the rotor.

SUMMARY

An exemplary rotor of the disclosure includes a shaft, a rotor core in a cylindrical shape, a connector, multiple magnets, and a cover. The shaft extends along a central axis. The rotor core surrounds the shaft. The connector is provided radially inside the rotor core and connects the rotor core and the shaft. The magnets are provided radially outside the rotor core and arranged along a circumferential direction. The cover is provided radially outside the magnets. The connector includes a body in a cylindrical shape and a flange. The body surrounds the shaft. The flange extends radially outward from one end in an axial direction of the body and faces the magnets in the axial direction. The cover includes a peripheral surface and an eave. The peripheral surface faces the magnets in a radial direction. The eave extends radially inward from an other end in the axial direction of the peripheral surface and faces the magnets in the axial direction.

The above and other elements, features, steps, characteristics and advantages of the present disclosure will become more apparent from the following detailed description of the preferred embodiments with reference to the attached drawings.

DETAILED DESCRIPTION

Hereinafter, exemplary embodiments of the disclosure will be described in detail with reference to the drawings. Further, in the specification, in a speed reducer 100, the rotation axis of a shaft 11 is referred to as the "central axis C," and the direction parallel to the central axis C is referred to as the "axial direction." Further, the direction orthogonal to the central axis C of the shaft 11 is referred to as the "radial direction," and the direction along the arc centered on the central axis C of the shaft 11 is referred to as the "circumferential direction." Further, in the disclosure, the axial direction is set to the vertical direction, and the shape and positional relationship of each part will be described. Further, the vertical direction is a name used only for description and does not limit the actual positional relationship and direction in the speed reducer 100.

Figure 1:
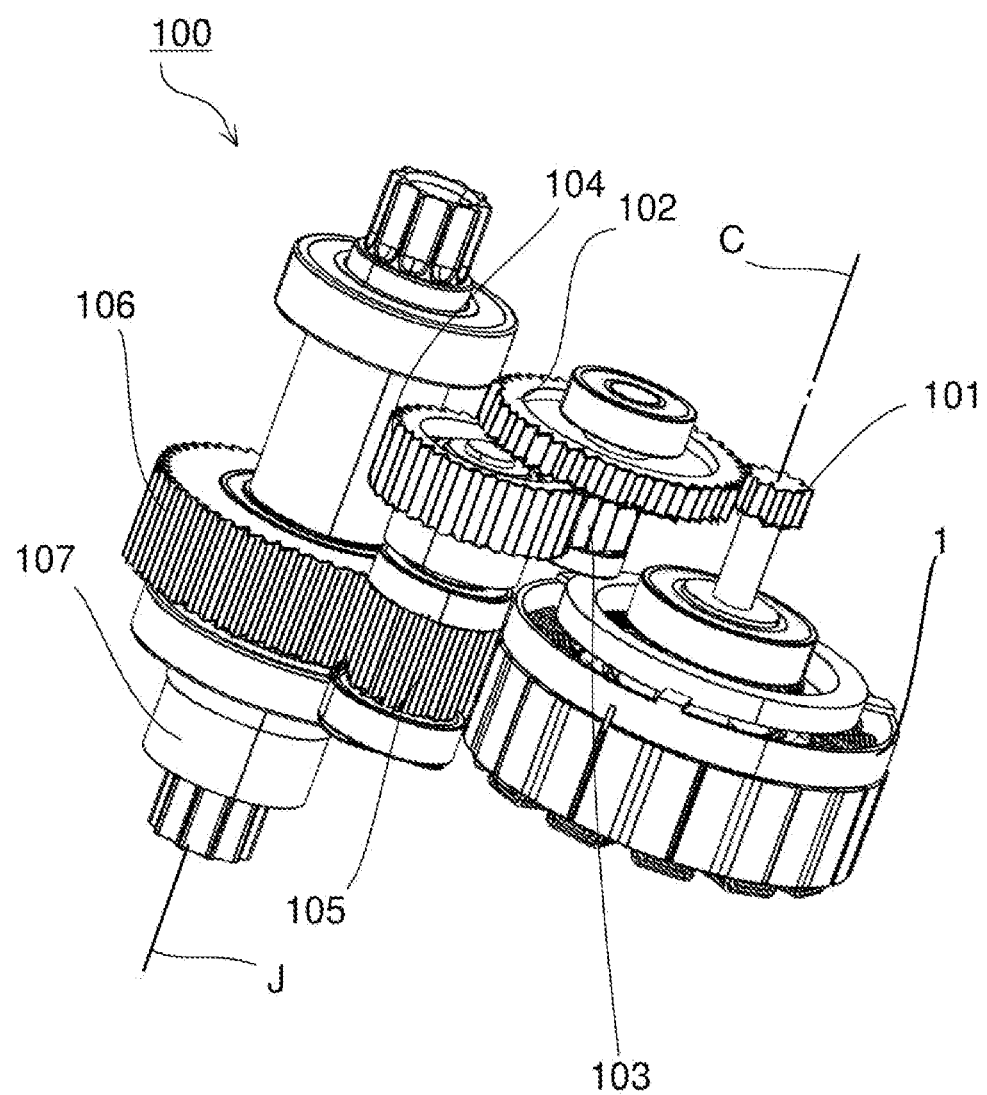
FIG. 1 is a perspective view of a speed reducer according to a first embodiment of the disclosure.

An exemplary embodiment of the speed reducer of the disclosure will be described below. FIG. 1 is a perspective view of the speed reducer 100 according to this embodiment. In FIG. 1, a housing which is the outer casing of the speed reducer 100 is not shown.

The speed reducer 100 converts a rotational movement with a first rotation speed into a rotational movement with a second rotation speed lower than the first rotation speed. The speed reducer 100 is used by being incorporated in, for example, a drive mechanism of an electrically power assisted bicycle. However, the speed reducer 100 of the disclosure may be used for other purposes.

The speed reducer 100 includes a rotor 10 described later and an input gear (gear) 101 connected to the shaft 11. Specifically, the speed reducer 100 includes a motor 1 including the rotor 10, the input gear (gear) 101, intermediate gears 102, 103, 104 and 105, an output gear 106, and a housing (not shown). The housing houses the motor 1, the input gear 101, the intermediate gears 102, 103, 104 and 105, and the output gear 106 inside. The input gear 101 is connected to the shaft 11 of the motor 1 described later, and rotates with the central axis C as the center together with the shaft 11.

The output gear 106 rotates with an output axis J as the center. The input gear 101 and the output gear 106 are connected via the intermediate gears 102, 103, 104 and 105.

The torque output from the motor 1 is transmitted through the input gear 101, the intermediate gears 102, 103, 104 and 105, and the output gear 106 in this order. The gear ratio of each gear, the number of gears, and the like are able to be changed in various ways according to the required speed reduction ratio. For example, in the speed reducer 100 used by being incorporated in the drive mechanism of the electrically power assisted bicycle, the output gear 106 is provided around a crankshaft 107 that rotates with the output axis J as the center. A sprocket (not shown) is connected to the crankshaft 107, and wheels are rotated by spinning a chain (not shown) connected to the sprocket. The crankshaft is connected to a pedal, and the pedaling force of the pedal is able to be assisted by the rotation of the output gear 106.

Figure 2:
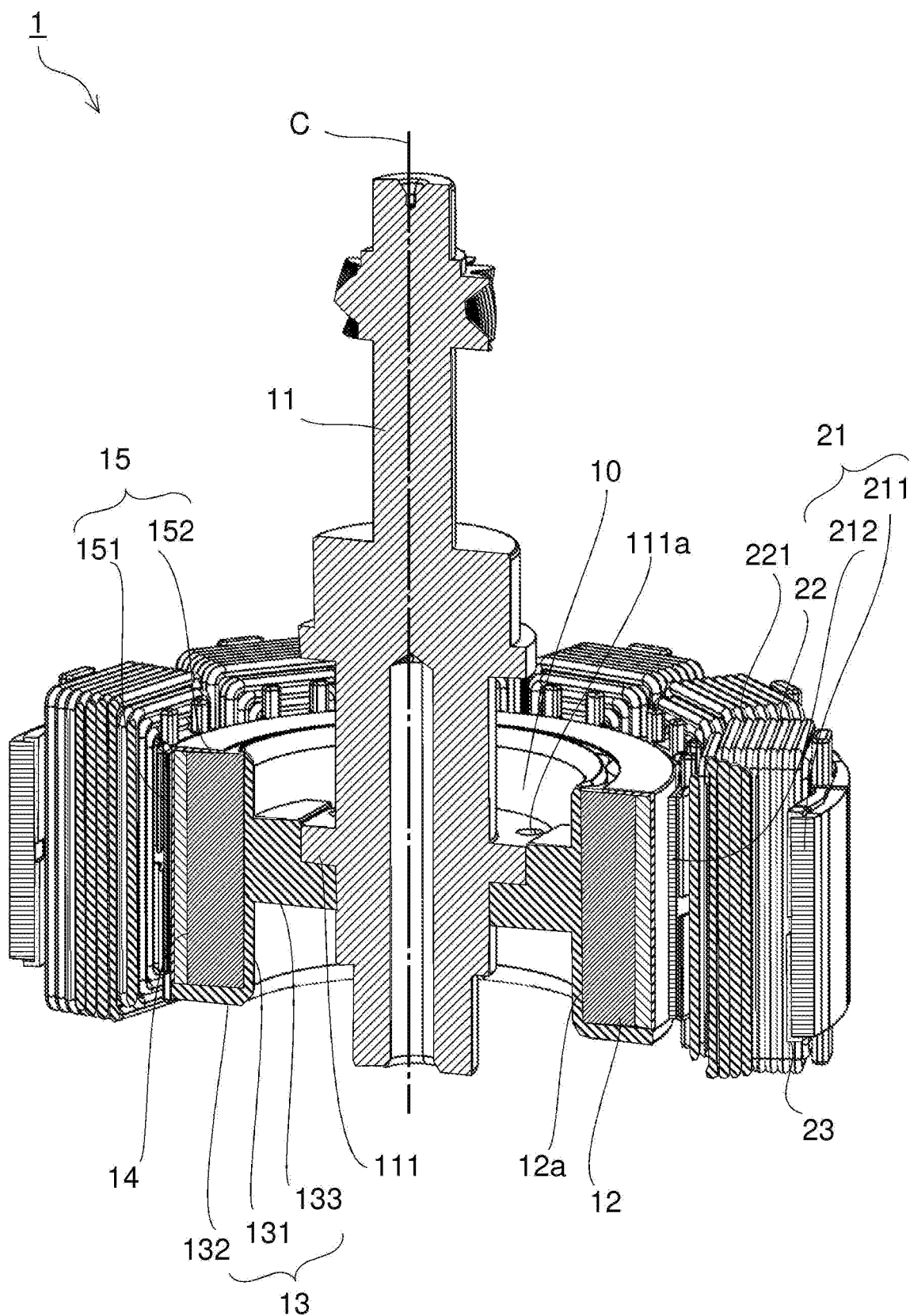
FIG. 2 is a longitudinal cross-sectional perspective view of the motor according to the first embodiment of the disclosure.
Figure 3:
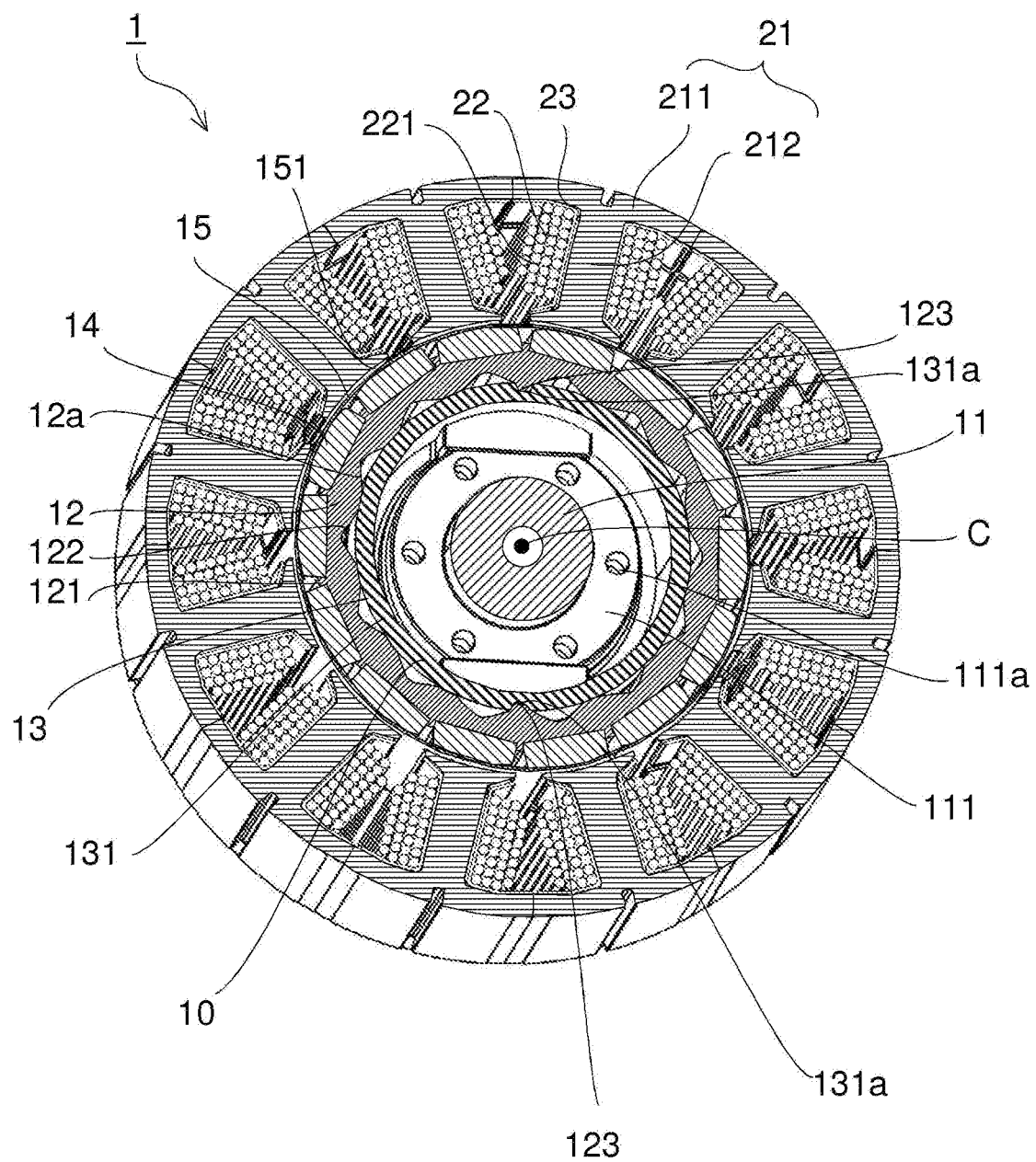
FIG. 3 is a transverse cross-sectional perspective view of the motor according to the first embodiment of the disclosure.
Figure 4:
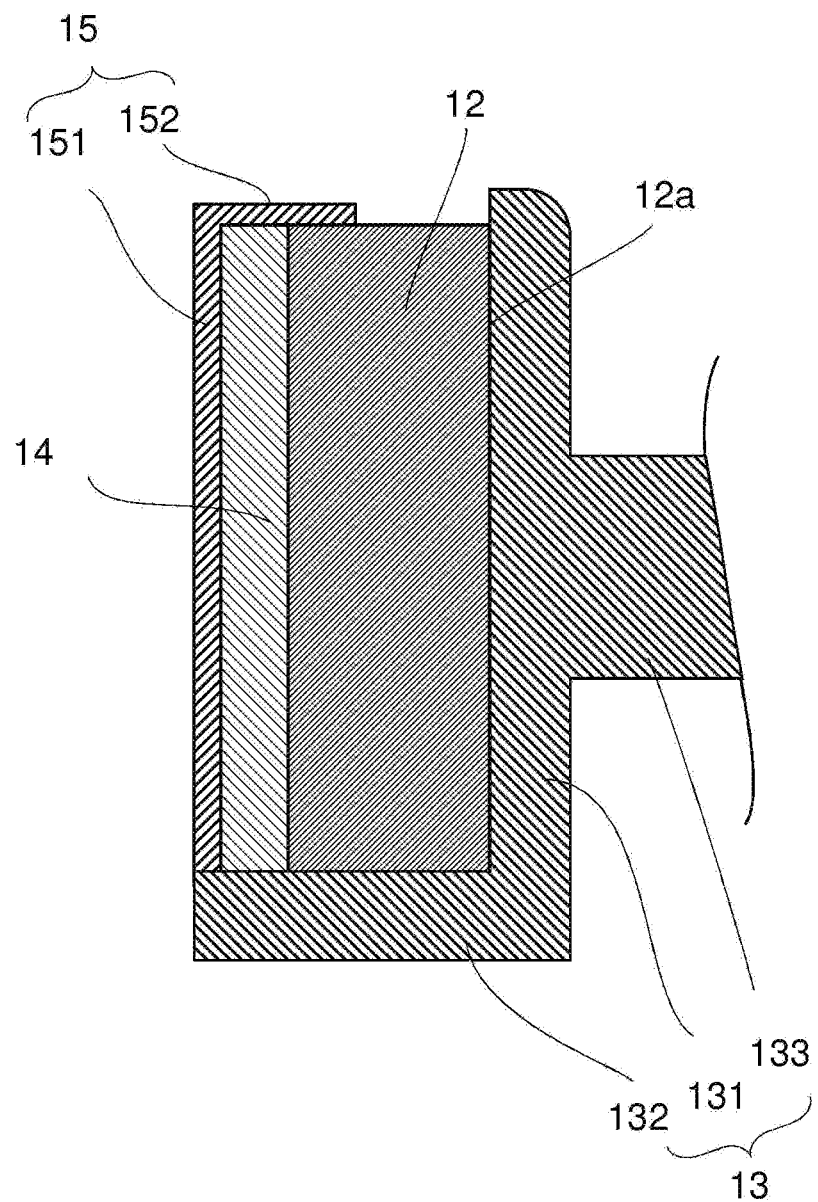
FIG. 4 is a schematic longitudinal cross-sectional view showing a portion of the rotor according to the first embodiment of the disclosure in an enlarged manner.

FIGS. 2 and 3 are a longitudinal cross-sectional perspective view and a transverse cross-sectional perspective view of the motor 1. FIG. 4 is a schematic longitudinal cross-sectional view showing a portion of the rotor 10 in an enlarged manner. The motor 1 includes the rotor 10 and a stator 20.

The rotor 10 is rotatable around the central axis C extending in the vertical direction. The rotor 10 includes the shaft 11, a rotor core 12, a connector 13, multiple magnets 14, and a cover 15.

The shaft 11 is a substantially columnar metal member extending along the central axis C. The shaft 11 has a ring 111. The ring 111 is provided to protrude on the radial outer surface of the shaft 11. The ring 111 is provided with a screw hole 111a penetrating in the axial direction. Multiple screw holes 111a are provided at substantially equal intervals in the circumferential direction.

The shaft 11 is rotatably supported via bearings (not shown). For example, ball bearings are used as the bearings. In addition, instead of the ball bearings, for example, slide bearings, fluid dynamic pressure bearings, or the like may be used.

The rotor core 12 is provided in a substantially cylindrical shape by laminating multiple annular electromagnetic steel sheets in the axial direction, and is provided with a through hole 12a extending in the axial direction in the center. The connector 13 and the shaft 11 are provided inside the through hole 12a, and the rotor core 12 surrounds the connector 13 and the shaft 11.

The rotor core 12 includes a protrusion 121, multiple recesses 122, and a male part 123. The protrusion 121 protrudes radially outward from the radial outer surface of the rotor core 12 and extends in the axial direction. Multiple protrusions 121 are provided at substantially equal intervals in the circumferential direction (see FIG. 3).

The recess 122 is recessed radially outward from the radial inner surface of the rotor core 12 and extends in the axial direction. Multiple recesses 122 are provided at substantially equal intervals in the circumferential direction. By providing the recesses 122, the weight of the rotor core 12 is able to be reduced.

The male part 123 protrudes radially inward from the radial inner surface of the rotor core 12, and is provided at two locations facing each other in the radial direction.

The connector 13 is provided radially inside the rotor core 12 and connects the rotor core 12 and the shaft 11. The connector 13 has a body 131, a flange 132, and a fixer 133. The body 131 surrounds the shaft 11 and is provided in a substantially cylindrical shape. The body 131 includes a female part 131a (see FIG. 3). The female part 131a is recessed radially inward from the radial outer surface, and is provided at two locations facing each other in the radial direction. The body 131 is press-fitted and fixed into the through hole 12a of the rotor core 12. At this time, the male part 123 is press-fitted into the female part 131a. That is, the female part 131a houses the male part 123. As a result, the connector 13 and the rotor core 12 are firmly fixed in the circumferential direction.

The fixer 133 extends radially inward from the radial inner surface of the body 131 and is provided in a substantially annular shape. The fixer 133 is provided with a fixing screw hole (not shown) recessed in the axial direction. Multiple fixing screw holes are provided at substantially equal intervals in the circumferential direction. The fixer 133 is overlapped with the ring 111 of the shaft 11 in the axial direction. At this time, the screw hole 111a and the fixing screw hole overlap in the axial direction and are screwed via a screw (not shown). As a result, the shaft 11 and the connector 13 are fixed.

The flange 132 extends radially outward from one end in the axial direction (lower end in this embodiment) of the body 131. The radial outer end of the flange 132 is located radially outside the radial outer ends of the magnets 14. As a result, the flange 132 faces the magnets 14 and the rotor core 12 in the axial direction, and supports the magnets 14 and the rotor core 12 in the axial direction.

The magnets 14 are provided radially outside the rotor core 12, and multiple magnets 14 are provided in the circumferential direction. The magnet 14 is provided in a substantially rectangular parallelepiped shape and is made of a magnetic member. The magnet 14 is fixed to the radial outer surface of the rotor core 12 via an adhesive (not shown). At this time, the magnets 14 adjacent to each other in the circumferential direction are provided so as to sandwich the protrusion 121 of the rotor core 12. By providing the protrusion 121, the magnets 14 are able to be easily positioned with respect to the rotor core 12.

The magnet 14 has an S pole and an N pole facing each other in the radial direction, and the adjacent magnets 14 have different magnetic poles on the radial outer surfaces. That is, the magnet 14 having the magnetic pole surface of the S pole on the radial outer surface and the magnet 14 having the magnetic pole surface of the N pole on the radial outer surface are provided alternately in the circumferential direction.

The cover 15 is provided radially outside the magnets 14. The cover 15 holds the magnets 14. The cover 15 is made of a magnetic material such as iron, and is manufactured by, for example, pressing. The cover 15 has a peripheral surface 151 and an eave 152.

The peripheral surface 151 is provided in a substantially cylindrical shape and faces the magnets 14 in the radial direction.

The eave 152 extends radially inward from the other end in the axial direction (upper end in this embodiment) of the peripheral surface 151. The radial inner end of the eave 152 is located radially inward of the radial inner ends of the magnets 14, and at least a portion of the eave 152 overlaps the rotor core 12 in the axial direction. As a result, the eave 152 faces and contacts the magnet 14 and the rotor core 12 in the axial direction. The eave 152 is fixed to the rotor core 12 via, for example, an adhesive. Therefore, it is possible to prevent the magnets 14 from being displaced upward in the axial direction during the rotation of the rotor 10. At this time, since the cover 15 is made of a magnetic material, the cover 15 is fixed to the magnets 14 by a magnetic force. Therefore, it is possible to further prevent the magnets 14 from being displaced upward in the axial direction during the rotation of the rotor 10.

The stator 20 is provided to face the radial outer side of the rotor 10 and includes a stator core 21, multiple coils 22, and an insulator 23.

The stator core 21 is provided by laminating multiple annular electromagnetic steel sheets in the axial direction. The stator core 21 includes a substantially annular core back 211 and multiple teeth 212 protruding radially inward from the core back 211. The multiple teeth 212 are provided at substantially equal intervals in the circumferential direction.

The insulator 23 is made of an insulating resin molded product and covers at least a portion of the stator core 21.

The coil 22 is provided by winding a conducting wire 221 around the teeth 212 via the insulator 23. The insulator 23 insulates the stator core 21 and the conducting wire 221.

When a drive current is applied to the coil 22, magnetic flux is generated in the multiple teeth 212. Circumferential torque is generated by the magnetic attraction and repulsion between the teeth 212 and the magnets 14. As a result, the rotor 10 rotates with the central axis C as the center with respect to the stator 20.

Figure 5:
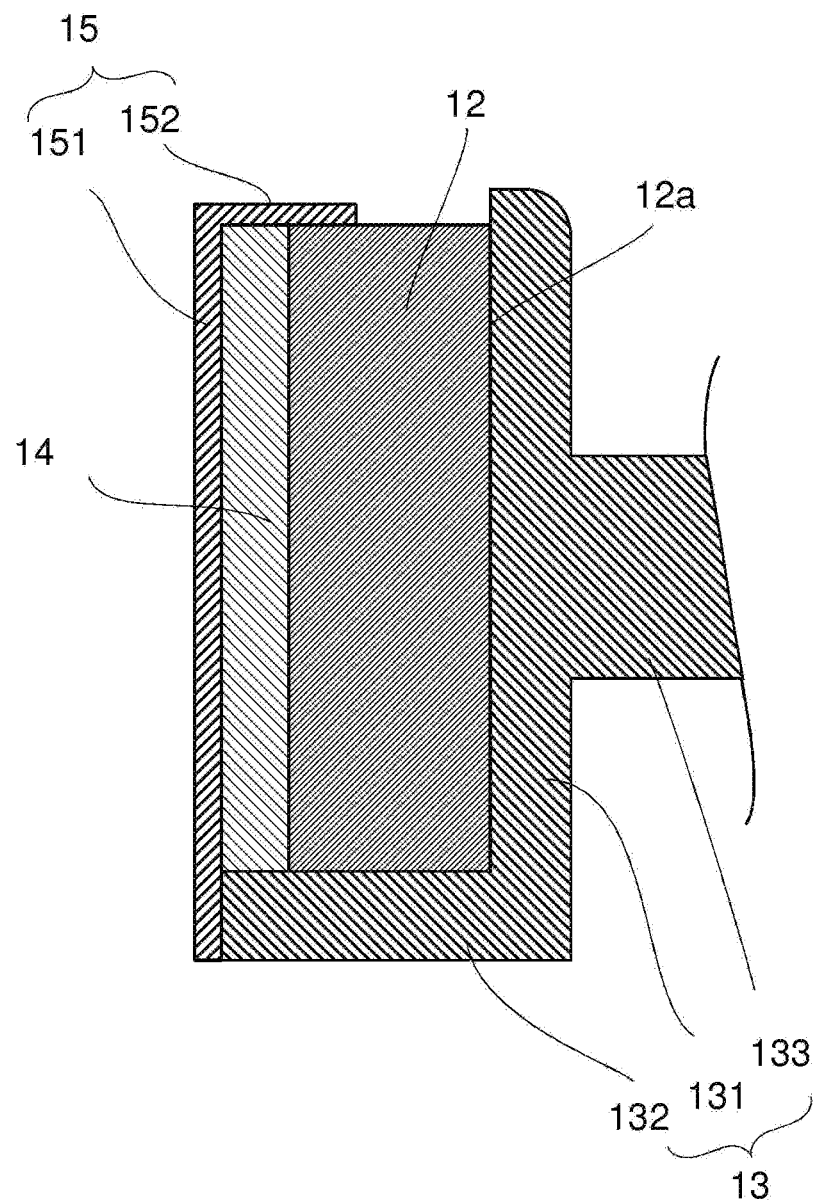
FIG. 5 is a schematic longitudinal cross-sectional view showing a portion of the rotor of a modified example according to the first embodiment of the disclosure in an enlarged manner.

FIG. 5 is a longitudinal cross-sectional view showing a portion of the rotor 10 of a modified example in an enlarged manner. The radial outer end of the flange 132 of the connector 13 comes into contact with the radial inner surface of the peripheral surface 151 of the cover 15. As a result, the contact area between the flange 132 and the cover 15 is able to be increased, and for example, the connector 13 and the cover 15 are able to be more firmly fixed via an adhesive. Therefore, it is possible to more reliably prevent the magnets 14 from being displaced upward in the axial direction during the rotation of the rotor 10.

Figure 6:
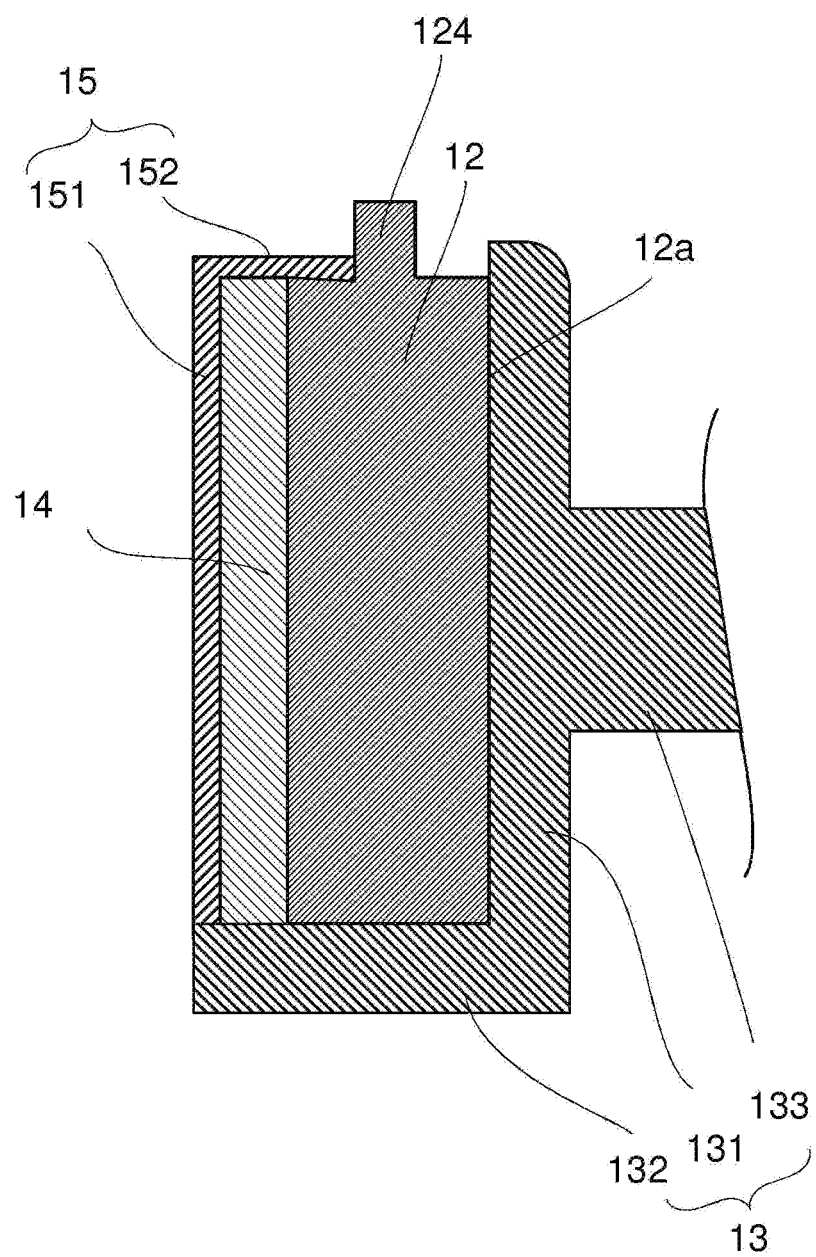
FIG. 6 is a schematic longitudinal cross-sectional view showing a portion of the rotor according to the second embodiment of the disclosure in an enlarged manner.

Next, a second embodiment of the disclosure will be described. FIG. 6 is a longitudinal cross-sectional view showing a portion of the rotor 10 according to the second embodiment in an enlarged manner. For convenience of description, the same parts as those in the first embodiment shown in FIGS. 1 to 5 described above are designated by the same reference numerals. In the second embodiment, the shape of the rotor core 12 is different from that of the first embodiment. Other parts are the same as those of the first embodiment, and the same effects as those of the first embodiment are achievable.

The rotor core 12 includes a projection 124 that protrudes in the axial direction from the upper side in the axial direction, and the radial inner end of the eave 152 comes into contact with the radial outer surface of the projection 124. As a result, the contact area between the eave 152 and the rotor core 12 is able to be increased, and for example, the cover 15 and the rotor core 12 are able to be firmly fixed via an adhesive. Therefore, it is possible to more reliably prevent the magnets 14 from being displaced upward in the axial direction during the rotation of the rotor 10.

The above embodiments are merely examples of the disclosure. The configurations of the embodiments may be appropriately modified without exceeding the technical idea of the disclosure. Moreover, the embodiments may be carried out in combination to the extent possible.

For example, in the embodiments, the connector 13 is provided with the female part 131a and the rotor core 12 is provided with the male part 123, but the connector 13 may be provided with the male part and the rotor core 12 may be provided with the female part. At this time, the male part protrudes radially outward from the radial outer surface of the connector 13, and the female part is recessed radially outward from the radial inner surface of the rotor core 12.

The disclosure is able to be used by being incorporated into, for example, a drive mechanism of a robot, a machine tool, an electrically assisted bicycle, or an electric wheelchair.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A rotor comprising:
a shaft which extends along a central axis;
a rotor core in a cylindrical shape which surrounds the shaft;
a connector which is provided radially inside the rotor core and which connects the rotor core and the shaft;
a plurality of magnets which are provided radially outside the rotor core and arranged along a circumferential direction; and
a cover which is provided radially outside the magnets, wherein the connector comprises:
a body in a cylindrical shape which surrounds the shaft;
a flange which extends radially outward from one end in an axial direction of the body and facing the magnets in the axial direction; and
a fixer extends radially inward from the radial inner surface of the body,
wherein the cover comprises:
a peripheral surface in a cylindrical shape which faces the magnets in a radial direction; and
an eave which extends radially inward from an other end in the axial direction of the peripheral surface and which faces the magnets in the axial direction, and
the fixer is thinner in the axial direction than the body.

2. The rotor according to claim 1, wherein a radial inner end of the eave is located radially inside radial inner ends of the magnets.

3. The rotor according to claim 1, wherein at least a part of the eave overlaps the rotor core in the axial direction.

4. The rotor according to claim 1, wherein the rotor core comprises a plurality of protrusions which protrude radially outward from a radial outer surface and are arranged in the circumferential direction, and
the magnets adjacent to each other in the circumferential direction are provided to sandwich the protrusions.

5. The rotor according to claim 1, wherein the rotor core comprises a projection which protrudes in the axial direction from an other end side in the axial direction, and
a radial inner end of the eave is in contact with a radial outer surface of the projection.

6. The rotor according to claim 1, wherein a radial outer end of the flange is located radially outside radial outer ends of the magnets.

7. The rotor according to claim 1, wherein a radial outer end of the flange is in contact with a radial inner surface of the peripheral surface.

8. The rotor according to claim 1, wherein the cover is made of a magnetic material.

9. A speed reducer comprising:
the rotor according to claim 1; and
a gear connected to the shaft.

* * * * *